United States Patent
Lepine et al.

(10) Patent No.: US 8,231,781 B2
(45) Date of Patent: Jul. 31, 2012

(54) FILTER END CAP ASSEMBLY WITH BYPASS VALVE

(75) Inventors: Kristopher W. Lepine, Kearney, NE (US); Steven M. Todd, Kearney, NE (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 13/272,759

(22) Filed: Oct. 13, 2011

(65) Prior Publication Data
US 2012/0031822 A1    Feb. 9, 2012

Related U.S. Application Data

(62) Division of application No. 12/436,525, filed on May 6, 2009, now Pat. No. 8,083,938.

(51) Int. Cl.
*B01D 27/10* (2006.01)
(52) U.S. Cl. .................................................. 210/130
(58) Field of Classification Search ........... 210/130–133
See application file for complete search history.

(56) References Cited

U.S. PATENT DOCUMENTS

| | | | |
|---|---|---|---|
| 2,076,935 A * | 4/1937 | Burckhalter | 210/132 |
| 2,533,266 A | 12/1950 | Kovacs et al. | |
| 3,355,021 A * | 11/1967 | Jones | 210/130 |
| 5,770,054 A | 6/1998 | Ardes | |
| 5,895,568 A * | 4/1999 | Koltunov | 210/130 |
| 5,922,196 A | 7/1999 | Baumann | |
| 6,217,755 B1 | 4/2001 | Stifelman et al. | |
| 6,579,448 B2 | 6/2003 | Dworatzek | |
| 6,986,426 B2 | 1/2006 | Clausen et al. | |
| 2004/0251184 A1 | 12/2004 | Buchhauser et al. | |
| 2008/0035540 A1 | 2/2008 | Pflueger et al. | |
| 2008/0308486 A1 | 12/2008 | Hacker | |
| 2009/0314697 A1 | 12/2009 | Ardes | |
| 2010/0282652 A1 | 11/2010 | Lepine et al. | |

FOREIGN PATENT DOCUMENTS

| | | |
|---|---|---|
| DE | 19809989 A1 * | 9/1999 |
| WO | WO 2007/128306 A2 | 11/2007 |
| WO | WO 2008/157244 A1 | 12/2008 |

\* cited by examiner

*Primary Examiner* — Terry Cecil

(74) *Attorney, Agent, or Firm* — Reinhart Boerner Van Deuren P.C.

(57) ABSTRACT

A filter assembly, filter element and methods are provided. The filter assembly includes a filter base in which a filter element is mounted. The filter element includes a bypass valve carried by the filter element that operates independent of and free of interaction with the filter base. Methods include providing an entirely new bypass valve for the filter assembly by inserting a filter element including a complete bypass valve into the filter base such that bypass valve structures of the filter base are rendered useless or superfluous.

9 Claims, 10 Drawing Sheets

FILTER END CAP ASSEMBLY WITH BYPASS VALVE

CROSS-REFERENCE TO RELATED PATENT APPLICATIONS

This patent application is a divisional of co-pending U.S. patent application Ser. No. 12/436,525, filed May 6, 2009, which is now pending, the entire teachings and disclosure of which are incorporated herein by reference thereto.

FIELD OF THE INVENTION

This invention generally relates to filter arrangements. More particularly, this application relates to filter arrangements for cleaning liquids such as oil or fuel for engines.

BACKGROUND OF THE INVENTION

Fluid filters are commonly used in connection with lubrication and fuel supply systems for internal combustion systems as well as hydraulic systems. The filter assures that downstream systems operate properly. Many systems utilize replaceable filter elements such that when the filtration media or device that actually does the filter becomes spent, it can be easily and cost-efficiently replaced without requiring the entire filter assembly being replaced.

However, upon excess buildup of filtered debris, the flow of fluid through the system can become limited which can hinder the operation and potentially damage the downstream system. As such, some filter assemblies have incorporated a fluid bypass that opens upon excess pressure build up. The bypass acts to allow dirty fluid to short-circuit the filter element of the filter assembly when the filter element becomes clogged with contaminants. Although it is not typically preferred to allow dirty fluid to flow through the filter without being filtered, it is more preferable than preventing a sufficient amount of fluid such as lubricating oil or fuel to flow through the system which can result in catastrophic engine failures.

An example of such a fluid filter is disclosed in U.S. Pat. No. 5,770,054 to Wilhelm Ardes. The '054 patent to Ardes includes a filter element with an upper plastic end cap providing a bypass valve seat that seats against a spring biased valve member on a standpipe in a housing. Due to end cap alignment issues and material issues, there are concerns about reliability of sealing, particularly at the valve seat formed integrally into the plastic upper end cap. Further, because the spring biased valve member forms part of the filter base, the spring biased valve member and its biasing mechanism, typically a coil spring, are not replaced when the spent filter element is replaced. Unfortunately, the Applicants have determined that this can result in additional problems. For example, the biasing mechanism can become worn such that the bypass valve will open under pressure that is too low, i.e. before the filter element becomes sufficiently spent.

Also, International Patent Application PCT/US2008/066739, published as WO 2008/157244 to John Hacker illustrates a further filter assembly using a bypass arrangement. In this arrangement, the filter element includes a valve member that interacts with a valve seat formed by the end cap. The valve member is axially biased against the valve member of the Ardes arrangement that forms part of the filter base to bias the valve member toward a closed position. While a portion of the bypass valve, namely the valve member, is replaced at each maintenance interval, the force biasing the valve member again relies on the biasing mechanism provided by the filter base. Thus, this design once again has the perceived downfalls.

The present invention relates to improvements over Ardes and Hacker and the current state of the art in fluid filters that incorporate a fluid bypass.

BRIEF SUMMARY OF THE INVENTION

The present invention relates to filter assemblies including new and improved bypass arrangements. More particularly, the present invention relates to filter assemblies including new and improved bypass arrangements that improve the reliability of the bypass arrangement and provide an ability to service the entire bypass arrangement. Further yet, the present invention relates to methods of servicing filter assemblies to provide a new bypass arrangement even while a portion of the old bypass arrangement remains part of the filter assembly, albeit useless.

In that regard, in a first embodiment of a method according to the present invention, a method of use for servicing a bypass valve of a filter assembly. The method includes the step of removing a spent filter element from a filter housing of a filter base. The filter base has at least a bypass valve member remaining therewith when the filter element is removed from the filter housing. The method also includes the step of inserting a filter element into the filter housing. The filter element has a complete filter element bypass valve such that the bypass valve member of the filter base of the filter assembly is no longer used in any way for fluid bypass and is no longer a bypass valve member. By providing a bypass valve carried by the filter element, the accuracy and integrity of the bypass valve is not diminished because it is replaced at each maintenance interval.

In one particular implementation, the step of inserting the filter element includes inserting the filter element into the filter housing such that the complete filter element bypass valve does not interact with the filter base. In a more particular implementation, the step of inserting the filter element includes inserting the filter element into the filter housing such that the complete filter element bypass valve is laterally offset from the bypass valve member of the filter base. In an even more particular implementation, the step of inserting the replaceable filter element includes inserting the replaceable filter element into the filter housing such that the complete filter element bypass valve, at least in part, axially overlaps with the bypass valve member of the filter base.

A filter assembly comprising a filter base and a replaceable filter element is also provided. The filter base includes a housing. The replaceable filter element is operably mounted in the housing. The replaceable filter element includes a ring of filter media, a first end cap and a bypass valve. The ring of filter media defines an open interior. The first end cap is secured to a first end of the filter media and defines a flow path fluidly communicating the open interior with an exterior of the replaceable filter element. The exterior of the replaceable filter element is within the housing. The bypass valve has a valve member movable between a closed position preventing fluid flow through the flow path from the exterior to the open interior and an open position permitting fluid flow through the flow path from the exterior to the open interior. The bypass valve also includes a biasing member biasing the valve member toward the closed position.

In one particular implementation, the filter element completely caries a complete valve such that the bypass valve operates entirely free of interaction with the filter base.

In a more particular implementation, the filter base includes an inner support with a spring biased valve member therein that remains with the filter base when the replaceable filter element is removed from the housing. The replaceable filter element is operably mounted over the inner support. The bypass valve does not interact with the spring biased valve member when operably mounted over the inner support. In an even more particular implementation, the first end cap includes a first portion spaced apart from a second portion with the valve member being interposed between the first portion and the second portion. The first portion is a generally annular member defining a first aperture communicating with the open interior and the second portion includes a second aperture. The flow path communicating the first and second apertures when the bypass valve is in the open position.

In an implementation, a free end of the inner support extends through the first aperture. Additionally, the spring biased valve member of the filter base is in the free end of the inner support and is axially exposed. The second portion has a continuous central portion, forming no part of the bypass valve, that extends across first aperture and the free end of the inner support rendering the spring biased valve member of the inner support inoperable for providing fluid bypass. The filter element may include a second end cap secured to a second end of the filter media. The second end cap including a third aperture. The inner support extending through the third aperture.

Further yet, aspects of the invention provide a replaceable filter element. The replaceable filter element can be used to replace a fluid bypass valve every time the filter element is replaced. The filter element includes an annular ring of filter media for filtering fluid. The filter media defines an open interior. The filter element includes a first end cap secured to a first end of the filter media. The first end cap defines a flow path fluidly communicating the open interior with an exterior of the replaceable filter element. The filter element also includes a bypass valve having a valve member movable between a closed position preventing fluid flow through the flow path from the exterior to the open interior and an open position permitting fluid flow through the flow path from the exterior to the open interior and a biasing member biasing the valve member toward the closed position.

In a preferred embodiment, the valve member and biasing member are carried by the first end cap.

In further particular implementations, the first end cap includes a first portion spaced apart from a second portion and the valve member is interposed between the first portion and the second portion. In such an arrangement, the biasing member is operably interposed between the valve member and the first portion of the end cap such that the biasing member biases the valve member toward the second portion. Even more particularly, the first portion may be a generally annular member defining a first aperture communicating with the open interior and the second portion includes a second aperture such that the flow path communicates the first and second apertures.

In a further implementation, the first portion of the end cap is connected to the first end of the filter media and the second portion of the end cap is axially spaced from the first portion. The biasing member biases the valve member away from the first portion and the filter media toward the second portion. The valve member prevents fluid flow through the second aperture in the closed position and permits fluid flow through the second aperture in the open position.

In one embodiment, the first end cap is an assembly of parts with the first portion being attached to the second portion. More particularly, an annular sidewall axially connects the first and second portions. The annular sidewall may form a part of a well that receives the first end of the filter media.

An additional method includes providing a bypass arrangement for permitting fluid to bypass a filter element of a filter assembly comprising the step of inserting a filter element into a filter base, the filter base having, at least a portion of a first bypass valve carried by the filter base, the filter element having a complete second bypass valve such that the at least a portion of a first bypass valve carried by the filter base is no longer used in any way for fluid bypass and is not a bypass valve member.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
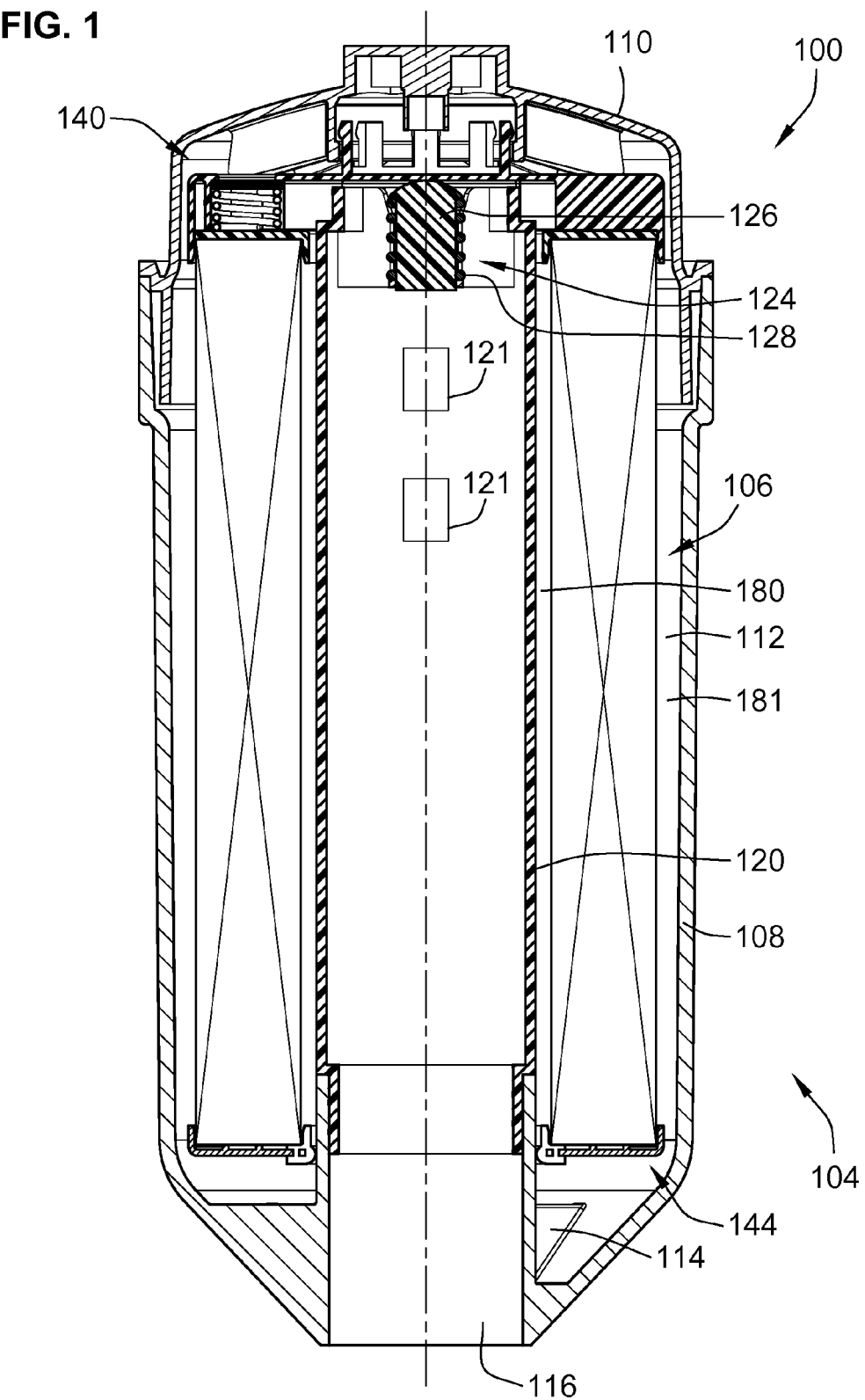
FIG. 1 is a cross-sectional illustration of a filter assembly according to an embodiment of the present invention

FIG. 1 is a cross-sectional illustration of an embodiment of a filter assembly 100 according to the teachings of the present invention. The filter assembly 100 is typically used to filter fluids and more typically liquids and even more typically filtering fuel, lubricants or hydraulic fluid.

The filter assembly 100 generally includes a filter base 104 that is a reusable portion of the filter assembly 100 and a replaceable filter element 106 (also referred to generally as "filter element 106") that gets replaced at service intervals or when otherwise becomes spent. Thus, the replaceable filter element 106 is removably mountable within filter base 104.

The filter base 104 includes an annular housing body 108 to which a housing cover 110 is releasably secured. As used herein, "annular" can refer to any ring like structure and need not be circular. It includes, by way of non-limiting example, polygonal shapes, elliptical shapes, oblong and oval shapes as well. The housing body 108 and housing cover 110 combine to form a filtration chamber 112 in which the replaceable filter element 106 is housed. The housing cover 110 may be removed from the housing body 108 during maintenance to provide access to an old spent filter element for removal and to allow new clean filter elements to be installed.

The filter element 106 separates a dirty fluid inlet 114 from a clean fluid outlet 116 causing any fluid flow through the filter assembly 100 and particularly filter base 104 to pass through the filter element 106 during normal operation such that the fluid is cleaned by the filter element 106.

The filter base 104 of the illustrated embodiment further include a central support 120 about which the replaceable filter element 106 is operably mounted. The central support 120 is porous or includes apertures 121 that permits fluid to flow to the clean fluid outlet 116 after it has passed through filter element 106.

The central support 120 includes a bypass valve arrangement 124 carried in a free end thereof. The bypass valve arrangement 124 includes a valve member 126 and a biasing member 128, illustrated in the form of a coil spring. The valve member 124 includes an axial sealing surface 130 (see FIG. 3) that is axially exposed when no filter element is inserted into the filtration chamber 112. The sealing surface 130 is axially exposed because it is intended, in other arrangements not covered by this invention, to cooperate with cooperating sealing structure of a corresponding filter element (not shown), such as illustrated in Ardes '054, to provide a complete fluid bypass valve when the filter element is installed. In those arrangements, the sealing surface 130 is urged against and seated against a cooperating sealing surface bounding an aperture through the filter element to prevent fluid bypass during normal operation. Dirty fluid will pass through the aperture in the filter element, typically through an end cap of the filter element, and act on the axial sealing surface 130. The biasing member 128 acts to axially bias the valve member 126 toward the housing cover 110 and oppose the forces provided by the dirty fluid during normal operation.

In those arrangements such as disclosed in Ardes '054, when the filter element becomes sufficiently clogged, the fluid pressure external to the filter element will continually increase due to insufficient flow until a predetermined pressure is reached at which time the fluid will bias the valve member axially away from the housing cover 110. This will break a seal between the filter element and the valve member 126 allowing fluid bypass.

Unfortunately, neither the valve member 126 nor the biasing member 128 are replaced at service intervals as these portions of the bypass valve arrangement are provided by the filter base 104 itself, namely the central support 120. Thus, the biasing member 128 can wear and become weakened allowing premature actuation of valve member 126 and thus allowing premature dirty fluid bypass. Similarly, the valve member sealing surface 130 may become damaged reducing its ability to seal against the cooperating sealing structure of the corresponding filter element (i.e. the filter element of Ardes '054).

The replaceable filter element 106 according to an embodiment of the present invention includes the entire bypass valve 140, not just a portion against which valve member 126 of the filter base 104 acts, and in fact no portion against which valve member 126 acts. Thus, in filter assembly 100, the spring biased valve arrangement 124 is rendered useless when combined with the filter element 106 such that the bypass valve arrangement 124 forms no part of the bypass valve and the valve member 126 of the filter base 104 is no longer a bypass valve member at all. That structure is now merely excess parts that have no function.

Figure 2:
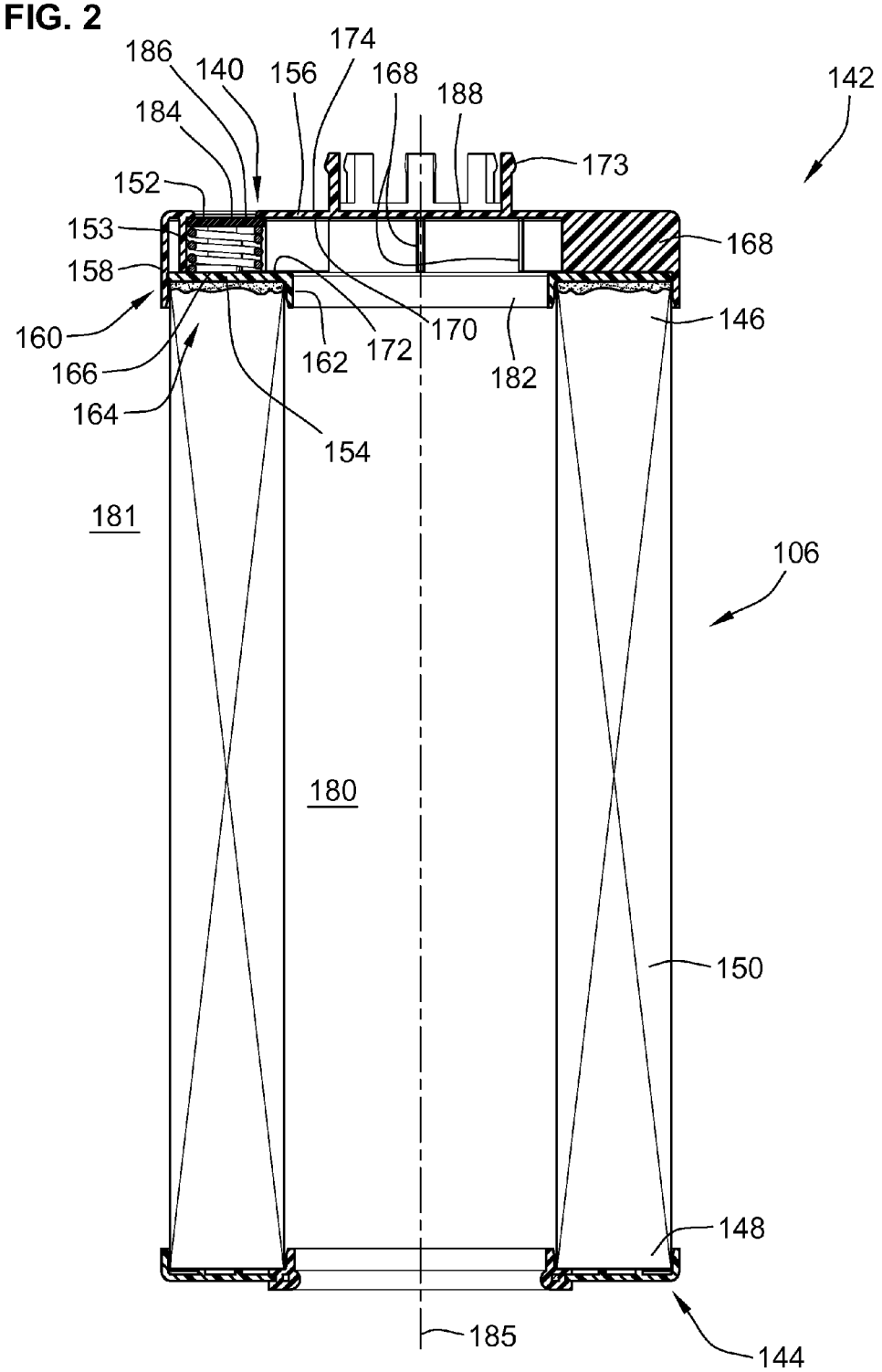
FIG. 2 is a cross-sectional illustration of the filter element of the filter assembly of FIG. 1 with a bypass valve in a closed position.

FIG. 2 is a cross-sectional illustration of one filter element 106 according to the teachings of the present invention. The replaceable filter element 106 generally includes first and second end caps 142, 144 operably connected to first and second ends 146, 148, respectively, of an extension of filter media 150.

Figure 3:
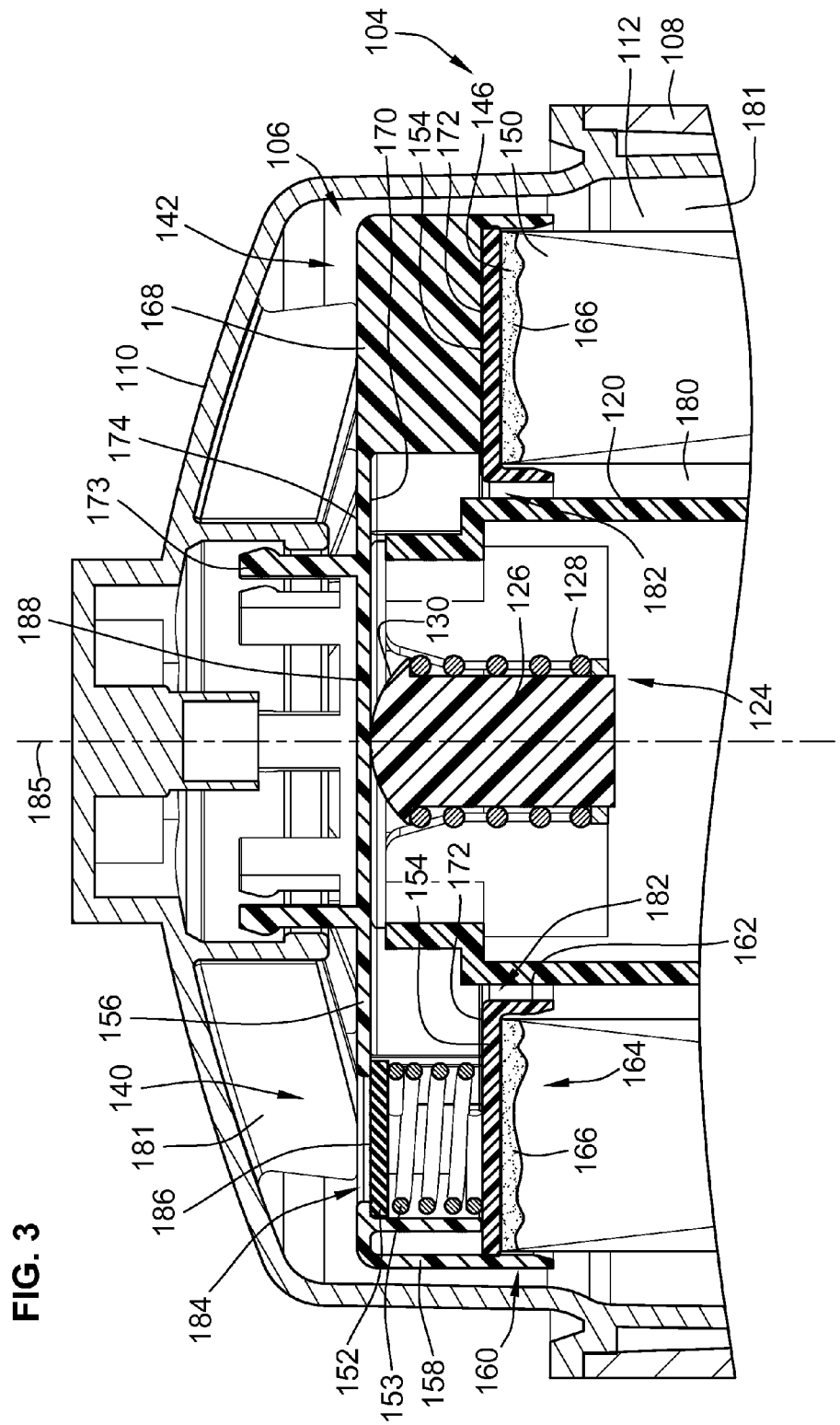
FIG. 3 is an enlarged partial cross-sectional illustration of the filter assembly of FIG. 1 illustrating the bypass valve of the filter element in a closed condition.

With reference to FIGS. 2 and 3, the bypass valve 140 includes a valve member 152 and a biasing member 153 that are entirely carried by the filter element 106, and as illustrated, are carried by first end cap 142. In other words, the complete bypass valve of the filter assembly 100 is provided by the filter element 106. As will be more fully explained below, the valve member 152 interacts with the rest of first end cap 142 to provide the bypass valve 140. However, in other embodiments, the bypass valve 140 could be provided by other portions of the filter element, such as through the filter media or carried by the second end cap 144.

In the illustrated embodiment, the first end cap 142 includes first (axially inner) and second (axially outer) portions 154, 156 that are axially spaced apart from one another. The valve member 152 and biasing member 153 are axially interposed between the first and second portions 154, 156.

An annular axially extending outer sidewall 158 axially connects the first portion 154 to the second portion 156. In a preferred embodiment, the axially extending outer sidewall 158 and the second portion 156 are formed as a one-piece construction. As used herein, one-piece construction shall not be construed to include a plurality of individual components connected together. The structures must be formed as a continuous piece, i.e. as a single molded part or stamped from a single piece of material. In a preferred arrangement, the first portion 154 is either press-fit or snap-fit (by way of cooperating structure such as for example inward and outward radially projecting ribs, projections or grooves) engaged within a cavity formed by the axially extending outer sidewall 158.

The axially extending outer sidewall 158 includes a free end portion 160 that extends axially downward beyond the first portion 154, i.e. toward the second end cap 144. Additionally, the first portion 154 preferably includes an annular axially extending inner sidewall 162 extending downward, i.e. toward second end cap. The inner and outer sidewalls 158 (particularly free end portion 160) and first portion 154 cooperate to form a well 164 for receiving the first end 146 of the filter media 150. In one embodiment, an adhesive agent 166 is used to secure the filter media in well 164. The adhesive agent 166, which may be, by way of non-limiting example only, a plastisol or polyurethane foam, also seals the junction between the first portion 154 and the axially extending outer sidewall 158 to prevent fluid leakage therebetween.

In alternative embodiments, the filter media 150 could be directly embedded into the end caps 142, 144. Also, both of the first and second portions 154, 156 could be formed as a single body that is a one-piece construction, rather than a plurality of components coupled together.

To assist in axially locating the first portion 154 relative to the second portion 156, the first end cap 142 also includes a plurality of axially extending spacing walls 168 that are laterally/angularly spaced apart permitting fluid flow therebetween. The axially extending spacing walls 168 are also formed, in the illustrated embodiment, with the second portion 156 into a continuous piece and extend axially from an inner surface 170 of the second portion 156 toward the first portion 154. The free ends of the spacing walls 168 axially abut an axially outer surface 172 of the first portion 154. However, the spacing walls 168 could be entirely omitted or could be independently formed from either the first or second portions 154, 156 or could be continuously formed with first portion 154.

Additionally, the first end cap 142 includes a plurality of axially extending attachment prongs 173 for attaching the replaceable filter element 106 to the housing cover 110 as illustrated in FIGS. 1 and 3. The attachment prongs 173 extend axially outward from an outer surface 174 of the second portion 156 that is opposite inner surface 170. The prongs 173 can include cooperating structure, such as the illustrated radial projections or protrusions that cooperate with corresponding structure of the housing cover 110. However, other structure could be incorporated to secure the replaceable filter element 106 to the housing cover 110. Such securement facilitates removal of spent filter elements and insertion of new filter elements during maintenance. More particularly, the filter element 106 that is spent remains connected to the housing cover 110 during removal.

The bypass valve 140 has a closed condition, illustrated in FIGS. 2 and 3, in which dirty fluid (external to the filter element 106, i.e. in area designated generally by reference numeral 181, when installed in filter base 104) is prevented from bypassing filter media 150. The bypass valve 140 also has an open configuration, illustrated in FIGS. 4 and 5, in which dirty fluid is permitted to bypass the filter media 150 and pass into the filter element 106.

The bypass valve 140 is formed in a flow path operably communicating the interior 180 of the filter media 150 with the exterior 181 of the filter media 150 without passing through filter media 150. The flow path in the illustrated embodiment is generally formed between a first aperture 182 and a second aperture 184.

The first aperture 182 is formed through the first portion 154, is generally bounded by inner sidewall 162 and opens into the interior 180 of the filter media 150. The first aperture 182 is generally centered on the first portion 154 and is co-axial with a central axis 185 of the filter media.

Figure 6:
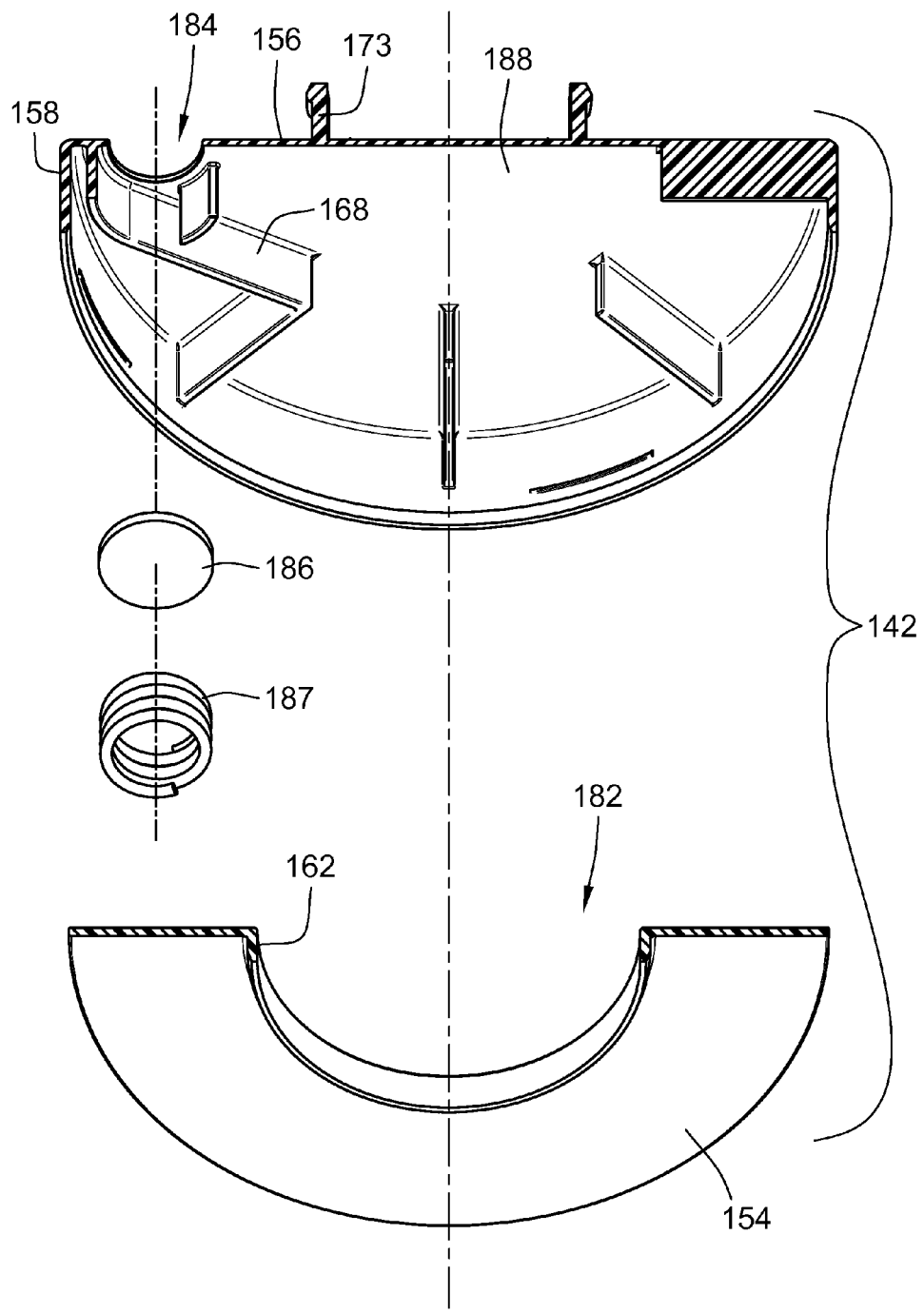
FIG. 6 is an exploded illustration of an end cap of the filter element of FIG. 2.

The second aperture 184 is formed through the second portion 156 and, in the illustrated embodiment, is laterally spaced apart from the first aperture 182 and toward sidewall 158 such that the second aperture 184 is radially interposed between the sidewall 158 and second first aperture 182. In the illustrated embodiment, the second aperture 184 does not radially overlap the first aperture 182. Further, the second aperture 184 is radially spaced outward from prongs 173. To permit fluid communication and mounting of valve member 152, the second aperture 184 is angularly positioned between adjacent ones of the axially extending spacing walls 168. The axially extending spacing walls 168, or similar projections, can be used to align the valve member 152 with second aperture 184 (see generally FIG. 6).

As illustrated in FIGS. 2 and 3, the bypass valve 140 includes the valve member 152 and the biasing member 153 illustrated in the form of a coil spring and also referred to herein as "coil spring 153." Coil spring 153 biases valve member 152 toward the external side of the structure in which aperture 184 is mounted. As such, coil spring 153 biases valve member 152 away from the first portion 154 and toward the second portion 156. As illustrated, coil spring 153 is axially interposed between the valve member 152 and top surface 172 of the first portion 154.

During normal operation, pressure of the dirty fluid external to the filter element 106 is sufficiently low that the biasing force acting on the valve member 152 is greater than the force applied by the dirty fluid pressure. Thus, during normal operation, the valve member 152 is biased axially against the inner surface 170 of the second portion 156. The valve member 152 is sized large enough to entirely overlap second aperture 184 to seal it and prevent fluid flow therethrough.

When the media 150 of the filter element 106 becomes spent, contaminants will resist flow of fluid therethrough causing the pressure of the dirty fluid external to the filter element 106 to rise. When the pressure of the dirty fluid reaches a predetermined level, the force applied by the dirty fluid to the top surface 186 (also referred to as a sealing surface) of the valve member 152 will be sufficient to overcome the biasing force of coil spring 153. This will cause the bypass valve 140 to open (see FIG. 4) and permit fluid flow along the flow path illustrated as arrow 187. This allows dirty fluid to bypass the filter media 150 to maintain a desired amount of fluid flow through the filter assembly 100 to prevent damage or decrease in performance of downstream systems utilizing the fluid.

In the illustrated embodiment, the valve member 152 is a flat disk. However, other shapes could be used. The top surface 186 can be contoured, such as for example rounded, conical, or tapered, so that it is guided into second aperture 184 to form a good seal therewith. Likewise, other biasing members could be used, such as for example a wave spring, a cantilevered resilient beam.

Additionally, the valve member 152 and biasing member (illustrated as two separate components, i.e. the disk and the spring) could be formed from a single piece. For example, a sufficiently rigid yet resilient continuous piece of foam could be used that will flex or compress when a sufficient amount of pressure is applied to the foam. Thus, the single continuous piece of foam would be considered to have both a valve member and a biasing member.

In the illustrated embodiment, the second portion 156 of the first end cap 142 is generally an imperforate disk-shaped portion, except for second aperture 184. Because aperture 184 is radially spaced from the center of the second portion 156 includes a continuous imperforate section 188 that extends entirely across the first aperture 182 of the first portion 154. The resilient mounting prongs 173 extend axially outward from this imperforate section 188.

Figure 4:
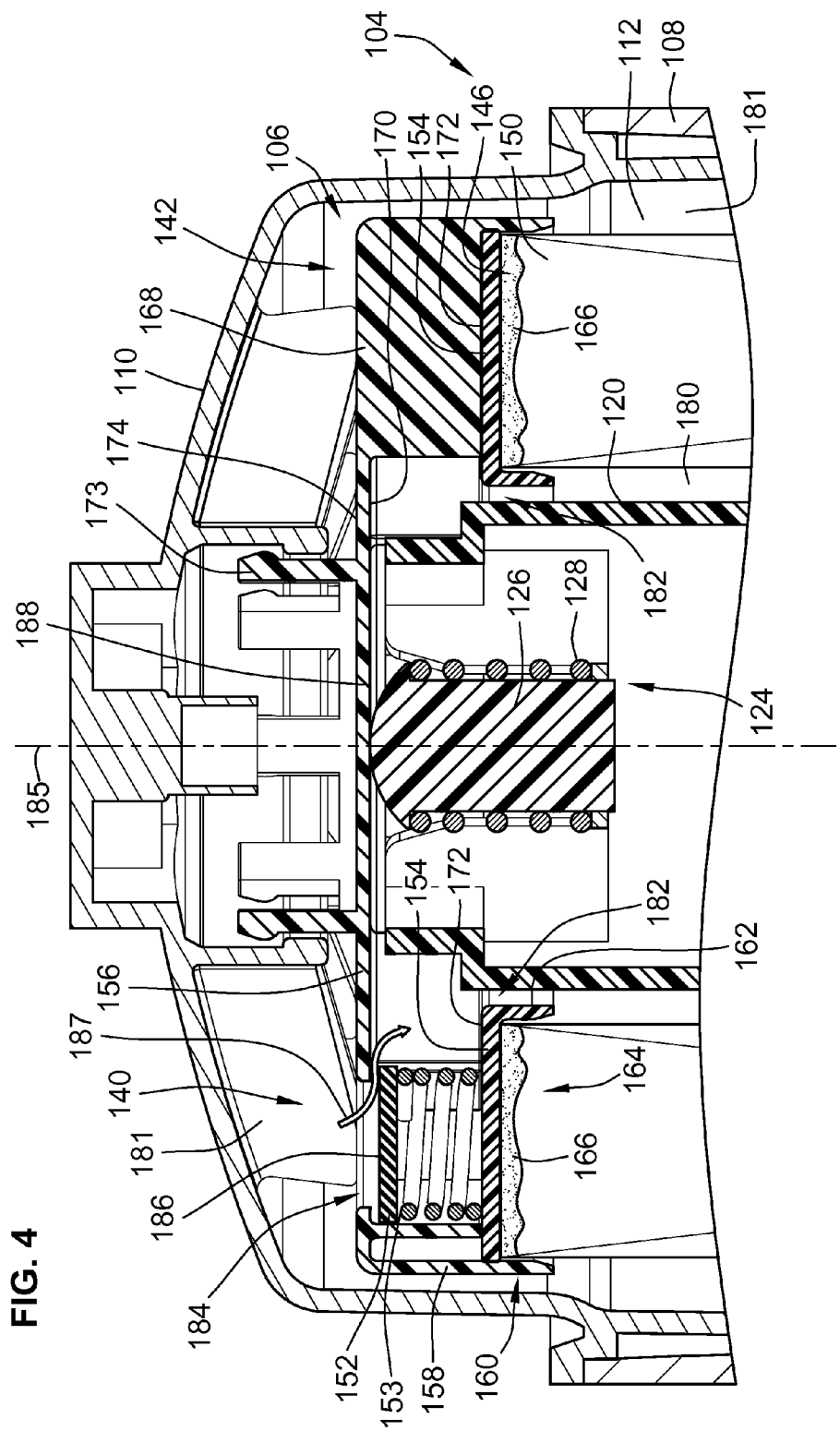
FIG. 4 is an enlarged partial cross-sectional illustration of the filter assembly of FIG. 1 illustrating the bypass valve of the filter element in an open condition.
Figure 5:
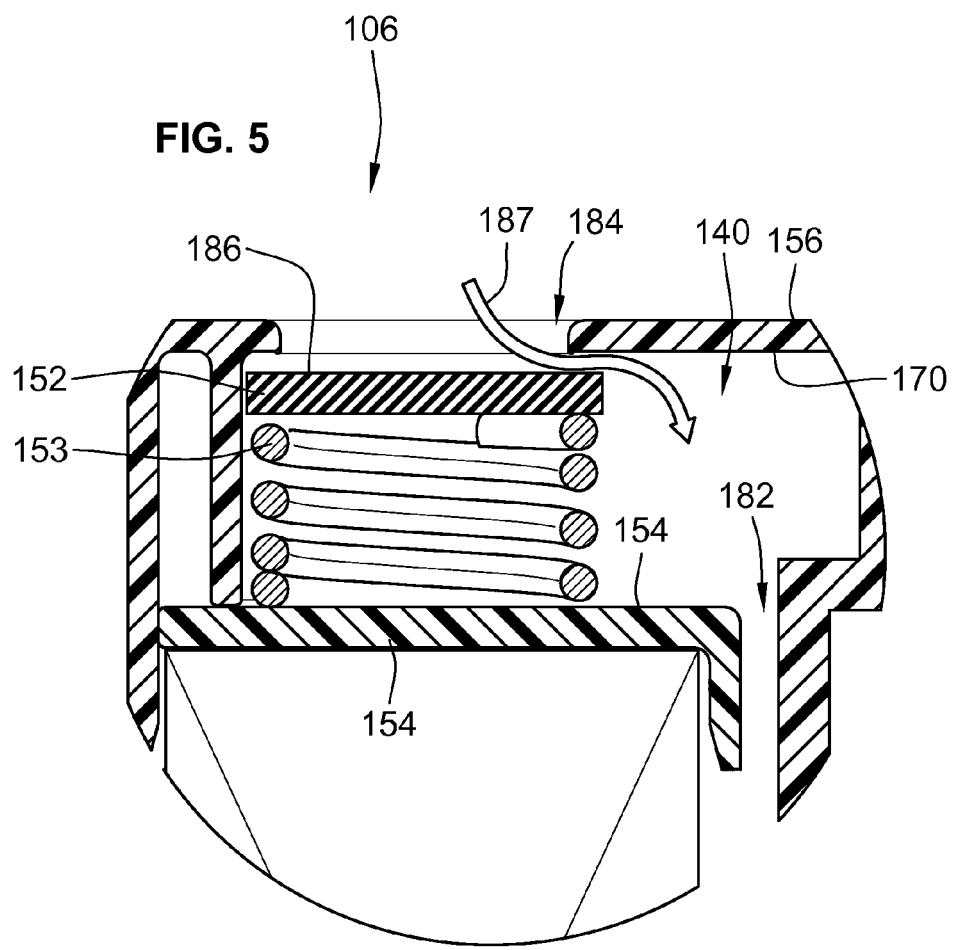
FIG. 5 is a further enlarged partial cross-sectional illustration of the filter element showing the bypass valve in the open condition.

With reference to FIGS. 3 and 4, when the filter element 106 according to the teachings of the present invention are mounted within filter base 104, the filter element 106 renders the bypass valve arrangement 124 and particularly valve member 126 and biasing member 128 useless such that the valve member 126 is deactivated and no longer a valve member at all, but is merely superfluous and unused.

When the filter element 106 of the illustrated embodiment is mounted within filter base 104, the free end of the central support 120 passes axially through first aperture 182. In this configuration, the central support 120 and particularly the valve arrangement 124 mounted in the free end of central support 120 aligns with the imperforate section 188 of end cap 156, thus preventing any dirty fluid from interacting with valve member 126.

In this configuration, bypass valve 140 of the filter element 106 is radially offset and spaced outward from bypass valve arrangement 124 of the filter base 104. Additionally, the bypass valve 140 of the filter element 106 axially, at least in part, overlaps with the bypass valve arrangement 124 of the filter base 104.

Thus, in this embodiment, the bypass valve 140 of the present invention in no way interacts with the filter base 104 and is completely provided by the filter element and is not provided, in part, by the filter base 104.

While not shown, the first end cap 142 could also include axially extending protrusions for engaging a locking member of a support tube. Such a locking member is illustrated in U.S. Pat. No. 6,986,426 to Clausen et al., entitled Extension and Locking Assembly for Dripless Element, and Container Therefore, the teachings and disclosure of which are incorporated herein by reference thereto. Whether or not such a locking member would be associated with a bypass valve member of the filter base, interaction of such an axially extending protrusion would not be using the bypass member 126 in any way to provide a fluid bypass valve.

Referring to FIG. 2, the second end cap 144 includes a seal member for radially sealing against internal support 120.

Because the filter assembly 100 of the present invention incorporating the filter element 106 discussed above does not utilize any portion of the bypass valve arrangement 124 of the filter base 104, all components of the bypass valve 140 are replaced at all maintenance intervals.

Embodiments of the present invention also relates to methods of use for servicing the bypass valve 140 of filter assembly 100. One method includes a first step of removing a spent filter element (this filter element could be one according to filter element 106 discussed above, or could be one similar to that taught by Ardes '054 or similar elements) from the filter housing 108 of the filter base 104. As discussed above, the filter base 104 includes at least a bypass valve member 124. The step of removing the spent filter element keeps the bypass valve member 124 with the filter base. After the spent filter element is removed, the method includes the step of inserting a replaceable filter element 106 into the filter housing 108, the replaceable filter element 106, as discussed above, having a complete filter element bypass valve 140 such that the bypass valve member 126 of the filter base 104 of the filter assembly 100 is no longer used in any way for fluid bypass and is not a bypass valve member.

In embodiments of the method using the filter element 106, the step of inserting the replaceable filter element 106 may include inserting the replaceable filter element 106 into the filter housing 108 such that the complete filter element bypass valve 140 does not interact with the filter base 104.

In embodiments of the method using the filter element 106, the step of inserting the replaceable filter element 106 may include inserting the replaceable filter element 106 into the filter housing 106 such that the complete filter element bypass valve 140 is laterally offset from the bypass valve member 126 of the filter base 104.

Further yet, the method may include inserting the replaceable filter element 106 into the filter housing 108 such that the complete filter element bypass valve 140, at least in part, axially overlaps with the bypass valve member of the filter base. Further, the filter element 106 may be inserted such that a distal end of a support 120 may align with an impervious or continuous portion 188 of the filter element 106 such that no fluid flow, normal flow or bypass flow flows axially through the filter element 106 towards the free end of the inner support 120.

Figure 7:
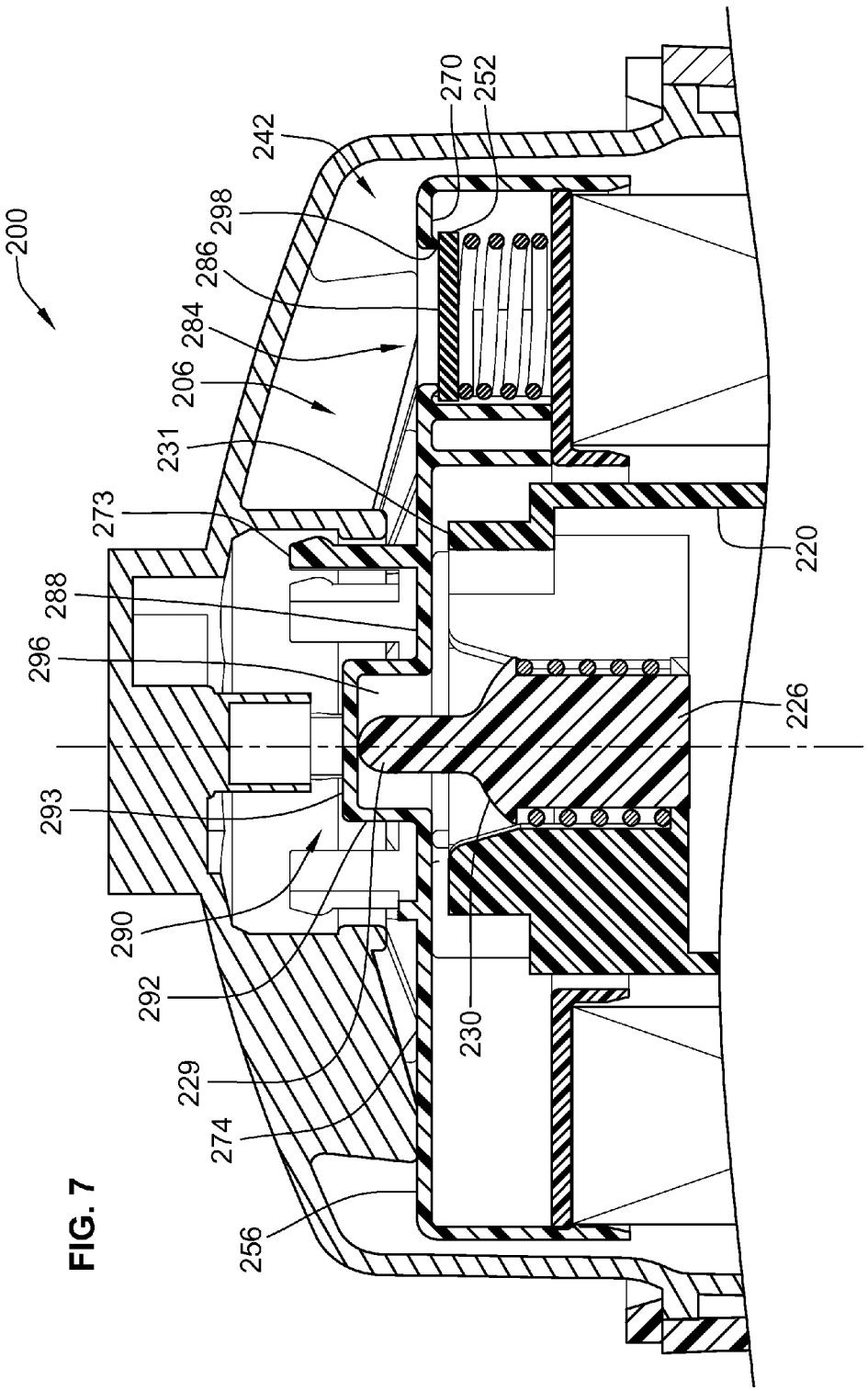
FIG. 7 is an enlarged partial cross-sectional illustration of a further embodiment of a filter element according to the present invention.

FIG. 7 illustrates a partial simplified cross-sectional view of an alternative embodiment of a filter assembly 200 according to the present invention. The current embodiment is substantially similar to the filter assembly 100 of the previous embodiments. However, this filter assembly 200 has a slightly different filter element 206 that will be more fully described below. The present embodiment has a slightly different bypass valve member 226 and top end cap 242.

Valve member 226 is carried by the central support 220 and has an axially extending projection 229 that extends axially outward from axial sealing surface 230. As illustrated, this axially extending projection 229 extends axially outward beyond the distal end 231 of the central support 220.

The filter element 206 includes a top end cap 242 that is substantially similar to the top end cap 142 of the prior embodiment. However, the second portion 256 of this embodiment does not have a substantially planar outer surface 274 (excluding attachment prongs 273). More particularly, the central imperforate section 288 of the second portion is not a planar portion as illustrated in the prior embodiment. More particularly, this imperforate section 288 includes an axially extending receiver portion 290. The axially extending receiving portion 290 includes an annular sidewall portion 292 and a top portion 293 that extends generally perpendicular to the annular sidewall portion 292. The thickness of the annular sidewall 292 and top portion 293 is substantially constant. Therefore, due to this arrangement, the axially extending portion 290 forms an internal cavity 296. This cavity 296 receives the axially extending projection 229 of the valve member 226 of the filter base because there is no aperture through this central imperforate section 288 to accommodate the axially extending projection 229. The axially extending receiver portion 290 is generally circumscribed by the axially extending prongs 273. However, axially extending receiver portion 290 is radially spaced inward from the attachment prongs 273. As cavity 296 receives the axially extending projection 229 of the valve member 226, the cavity opens toward the interior of the filter element 206.

The second portion 256 of end cap 242 also defines a sealing seat 298 in its inner surface 270. This sealing seat 298 is an annular projection having a tapered contour. The tapered contour has a wider base proximate the second portion 256 and a narrower tip forming a distal end of the sealing seat 298. The annular tip engages the top surface 286 of valve member 252. The tapered arrangement of sealing seat 298 provides a focused contact point (or line) between the seat 298 and the valve member 252 to increase sealing therebetween. The sealing seat 298 bounds and generally defines second aperture 284 in the second portion of the end cap 242.

Figure 8:
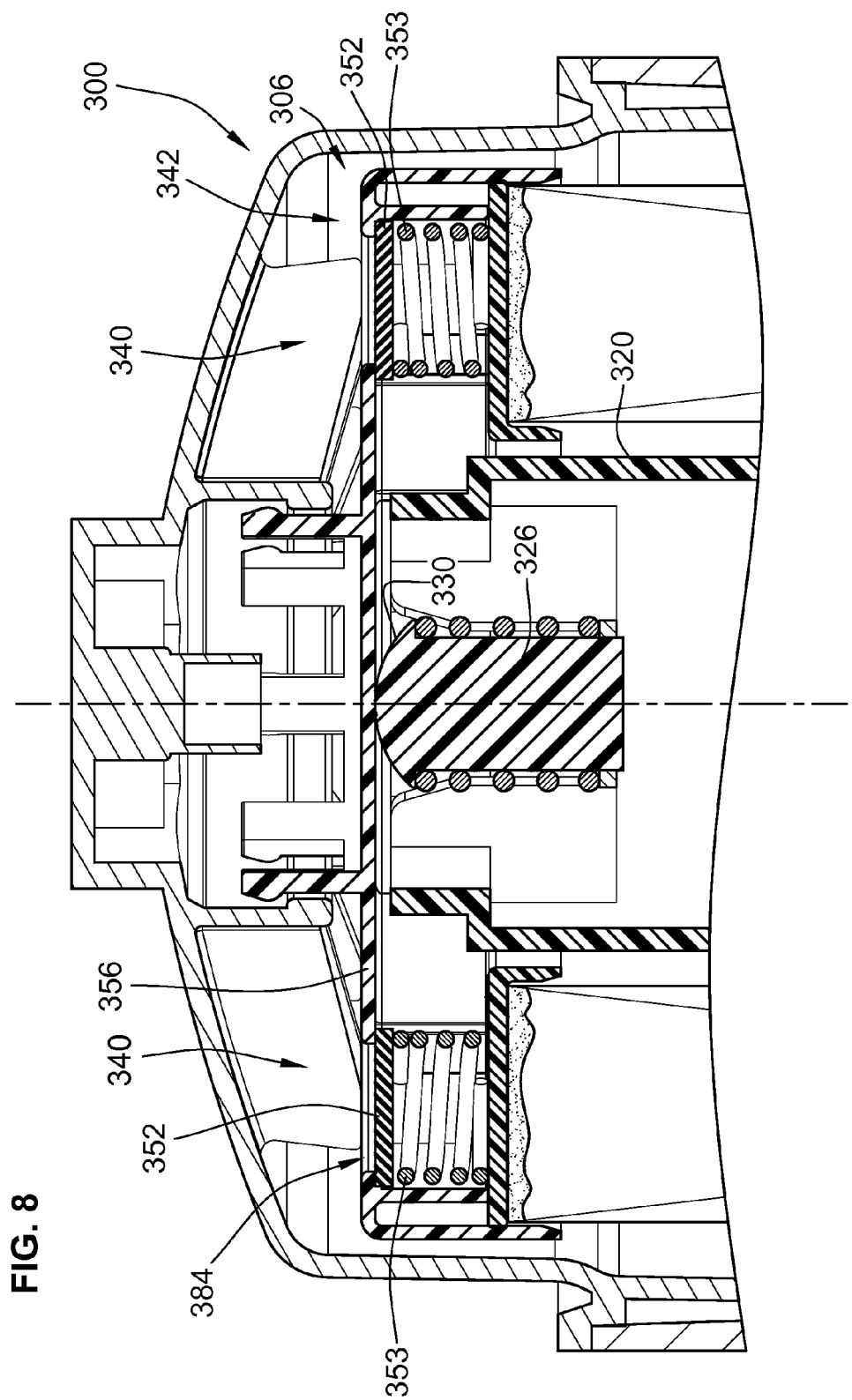
FIG. 8 is an enlarged partial cross-sectional illustration of a further embodiment of a filter assembly according to the present invention.

FIG. 8 illustrates a further embodiment of a filter assembly 300 including a further filter element 306. This filter assembly 300 is substantially similar to that of the embodiment illustrated in FIG. 3. However, the filter element 306 has a slightly different configuration.

In this embodiment, the filter element 306 includes a top end cap 342 that is similar to the end caps of previous embodiments except that includes a plurality of bypass valves 340 for permitting fluid bypass in the event that too significant a pressure is required to pump fluid through the filter media of the filter element, such as during cold start or when the filter element becomes sufficiently clogged or spent due to use and filtering of particulates from the fluid flowing therethrough.

The bypass valves 340 in the illustrated embodiment are identical and include identical vale members 352 that are acted on by identical biasing mechanisms, i.e. coil springs 353. By using a plurality of bypass valves 340 the ultimate size of the fluid bypass arrangement provided by the filter element 306 can be increased due to the increased area presented by the plurality of openings 384 passing through the second end cap portion 356 of the end cap 342.

By removing the requirement of relying on an interaction of the valve member 326 housed in the support 320, this ability to provide a desired bypass valve cross-sectional area is available. In prior arrangements, the filter element was required to provide an aperture through the end cap that was closely sized to the sealing surface 330 of the valve member 326. As such, construction of the bypass valve was limited by the mating structure provided by the filter base.

Further, by providing multiple bypass valves 340 the bypass arrangement, provided by the plurality of bypass valves 340, can be tuned for various conditions. For example, a first on the bypass valves 340 could have different spring constants or alternatively openings 384 having different sizes such that they will open at different pressure values such that there is a sequential, not simultaneous, opening of the various bypass valves 340. It may be necessary to have positive stops for various ones of the bypass valves 340 so as to limit the opening displacement of the bypass valve 340 so as to allow pressure to build above a given pressure rather than continuously opening the bypass valve 340 configured to open under less pressure.

Again, this could be highly beneficial such as to provide a first bypass valve 340 that opens under cold-start conditions due to high pressures generated due to cooler fluid. Once the fluid is heated, the bypass valve 340 would close again. However, if the filter element 306 becomes sufficiently plugged due to filtered particles or particulates, the first bypass valve 340 will open. Then, if the filter element 306 becomes further plugged increasing the pressure of the fluid external to the filter element 306, the second bypass valve 340 could open to permit an increased amount of bypass flow.

Further, while illustrated as both being formed by a single end cap arrangement, other filter elements according to the present invention could include one or more bypass valves in one end cap and one or more bypass valves in another end cap to provide the plurality of bypass valves.

Figure 9:
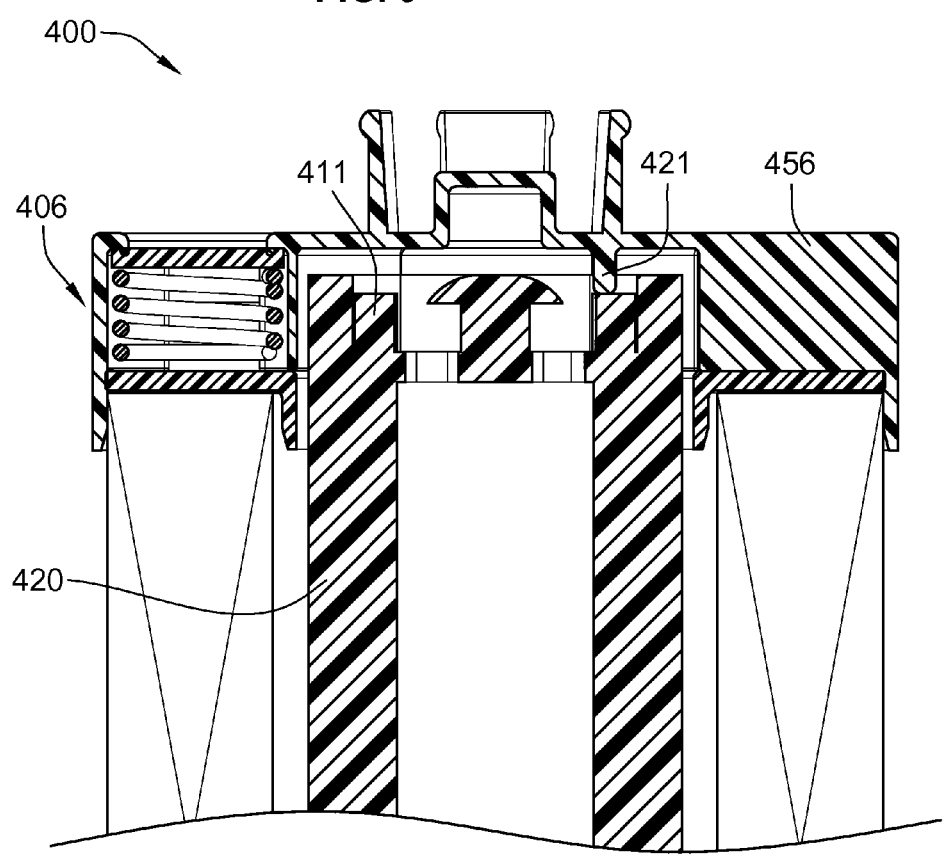
FIGS. 9 and 10 are further simplified cross-sectional illustrations of a further embodiment of a filter element and filter assembly according to the present invention.
Figure 10:
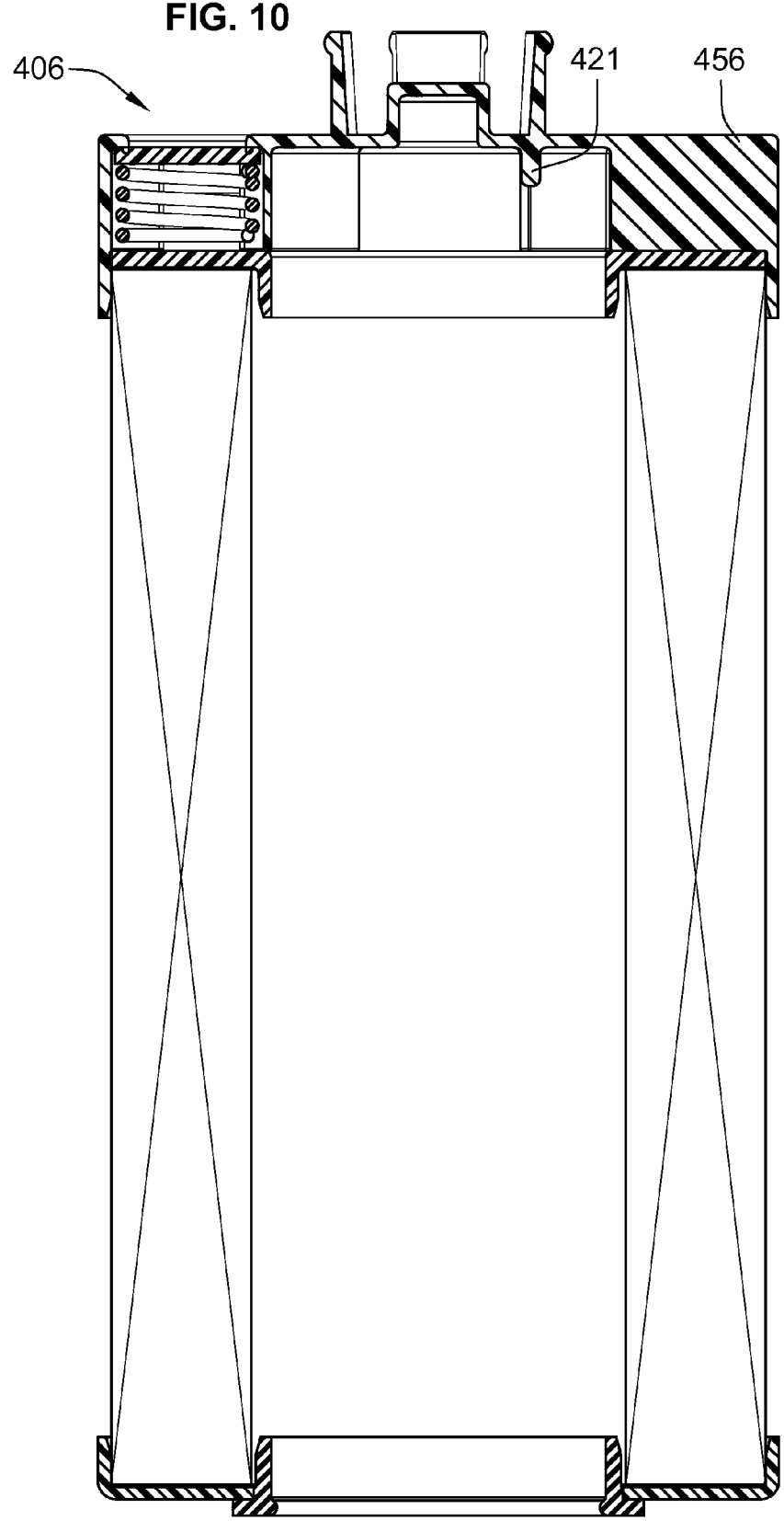

FIGS. 9 and 10 are highly simplified, partial, schematic representations of a further embodiment of a filter assembly 400 (FIG. 9) and filter element 406 (FIG. 10) according to the present invention.

This embodiment illustrates that the filter element 406 may include a means for actuating a latch or other device of the filter base. For instance, the support 420 may include a collar 411 that must be actuated prior to allowing any fluid flow to pass therethrough during normal operation. As such, the filter element 406 includes an actuation projection 421 that engages and axially biases the collar 411 axially when the filter element 406 is mounted over central support 420. In the illustrated embodiment, the actuation projection 421 is formed by the second end cap 456 into a one-piece construction.

Further, while the various illustrations illustrate a gap formed between the second end cap portion and the support, it should be noted that this need not be the case in other embodiments. For example, the first (inner) end cap portion could seal to the outer surface of the support such that fluid is required to flow through the portion of the support positioned axially between the first and second end cap portions. Typically, this will occur when the fluid internal to the filter element enters the central support through an axial end thereof. However, it could pass through apertures formed in the radial sidewalls of the central support.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly comprising:
   a filter base including a housing;
   a replaceable filter element operably mounted in the housing, the replaceable filter element including:
      a ring of filter media defining an open interior;
      a first end cap secured to a first end of the filter media, the first end cap defining a flow path fluidly communicating the open interior with an exterior of the replaceable filter element, the exterior of the replaceable filter element being within the housing;
      a bypass valve having:
         a valve member movable between a closed position preventing fluid flow through the flow path from the exterior to the open interior and an open position permitting fluid flow through the flow path from the exterior to the open interior;
         a biasing member biasing the valve member toward the closed position; and wherein:
   the filter base includes an inner support with a spring biased valve member therein that remains with the filter base when the replaceable filter element is removed from the housing;
   the replaceable filter element includes an imperforate section operably mounted over the inner support to deactivate the spring-biased valve thereof; and
   the bypass valve does not interact with the spring biased valve member when operably mounted over the inner support.

2. The filter assembly of claim 1, wherein the bypass valve operates entirely free of interaction with the filter base.

3. The filter assembly of claim 1, wherein:
   the first end cap includes a first portion spaced apart from a second portion, the valve member being interposed between the first portion and the second portion; and
   the first portion is a generally annular member defining a first aperture communicating with the open interior and the second portion includes a second aperture, the flow path operably communicating the first and second apertures when the bypass valve is in the open position.

4. The filter assembly of claim 3, wherein a free end of the inner support extends through the first aperture.

5. The filter assembly of claim 4, wherein:
the spring biased valve member is in the free end of the inner support and is axially exposed;
the second portion has a continuous central portion including the imperforate section, forming no part of the bypass valve, that extends across the first aperture and the free end of the inner support rendering the spring biased valve member of the inner support inoperable for providing fluid bypass.

6. The filter assembly of claim 1, wherein the bypass valve is entirely radially spaced from spring biased valve member such that there is no radial overlap.

7. The filter assembly of claim 6, wherein at least a portion of the bypass valve axially overlaps with the spring biased valve member.

8. The filter assembly of claim 1, further comprising a second end cap secured to a second end of the filter media, the second end cap including a third aperture, the inner support extending through the third aperture.

9. A replaceable filter element comprising:
an annular ring of filter media defining an open interior;
a first end cap secured to a first end of the filter media, the first end cap defining a central axis and a flow path fluidly communicating the open interior with an exterior of the replaceable filter element;
a complete bypass valve having:
a valve member movable between a closed position preventing fluid flow through the flow path from the exterior to the open interior and an open position permitting fluid flow through the flow path from the exterior to the open interior;
a biasing member biasing the valve member toward the closed position;
wherein the first end cap includes a first portion spaced apart from a second portion, the valve member being interposed between the first portion and the second portion;
wherein the biasing member is operably interposed between the valve member and the first portion of the end cap such that the biasing member biases the valve member toward the second portion;
wherein the first portion is a generally annular member defining a coaxial first aperture communicating with the open interior and the second portion includes a second aperture laterally spaced from the central axis, the flow path being defined between the first and second apertures;
wherein the first end cap is an assembly of parts with the first portion being attached to the second portion;
wherein the first end cap includes an annular sidewall axially connecting the first and second portions, the annular sidewall preventing fluid bypass between the first and second portions; and
wherein the annular sidewall is formed with the second portion as a continuous single piece, and wherein the first portion includes an axially extending inner annular sidewall extending axially from an annular portion, the first portion being received axially within the annular sidewall, the inner annular sidewall, the annular portion and the annular sidewall forming a well receiving the first end of the filter media.

* * * * *